Aug. 10, 1965   F. G. DANHIER   3,200,232
PROCESS AND APPARATUS FOR ELECTRIC FUSION WELDING
Filed June 11, 1963                          2 Sheets-Sheet 1

3,200,232
PROCESS AND APPARATUS FOR ELECTRIC FUSION WELDING
Francois Georges Danhier, Uccle-Brussels, Belgium, assignor to La Soudure Electrique Autogene, S.A., Brussels, Belgium, a corporation of Belgium
Filed June 11, 1963, Ser. No. 287,111
55 Claims. (Cl. 219—73)

The present invention relates to welding processes for metals especially ferrous metals and alloys such as steel including alloy steel, in which an electric current passes between at least one metallic electrode and the work to be welded to cause the creation of a molten weld pool and to deposit a layer of molten slag on such pool.

A purpose of the invention is to weld metals by maintaining an electric current between at least one metallic electrode and the work to be welded to cause the creation of a molten weld metal pool, to cover said pool with a non-basic slag by melting non-basic slag forming materials over the pool and feeding to the pool at least one tubular electrode which contains materials which form by fusion a basic slag, said tubular electrode supplying basic slag in a proportion which is so small that the resultant slag produced by mixing the basic slag forming materials with the non-basic slag remains non-basic.

A further purpose in the process just referred to is to employ non-basic slag forming materials which if melted by themselves produce a slag having a basicity index of less than 1, and to employ basic slag forming materials which if melted by themselves produce a slag having a basicity index greater than 2.

A further purpose in a process as above described is to employ slag forming materials of basic character which have the following composition by weight:

| | Percent |
|---|---|
| Low carbon ferromanganese (80% Mn and 1% C) | 6 to 11 |
| $CaF_2$ | 30 to 50 |
| MnO | 10 to 18 |
| $SiO_2$ | up to 16 |
| CaO plus MgO | 10 to 30 |
| Silicomanganese (25% Si, 74% Mn, 1% C) | 1 to 2 |
| Miscellaneous | up to 6 |
| | 100 | and in which the slag forming materials of non-basic character which are brought into the weld pool independently from the slag forming materials of basic character have the following composition by weight:

| | Percent |
|---|---|
| $SiO_2$ | 45 to 65 |
| $Al_2O_3$ | up to 6 |
| MnO | 30 to 50 |
| Miscellaneous | up to 4 |

A further purpose in submerged arc welding of low carbon and low alloy steels is to maintain an electric arc to work and thus produce a molten weld pool, at least one electrode for said arc being a tubular electrode having a core which contains oxidizing ingredients, to decarburize the weld pool by said oxidizing ingredients and supply a granular flux of deoxidizing charcter which operates on the pool to deoxidize the pool behind said electrode after the pool has been oxidized by the electrode in decarburizing the weld pool.

A further purpose in a process to submerged arc welding of low carbon and low alloy steels, is to arc to the work from at least two electrodes, to progress said electrodes relatively to the work with the electrodes spaced apart in the direction of weld travel but close enough together to form a single weld pool, each of said electrodes having a flux core, bringing into the weld pool by the forwardmost electrode an oxidizing ingredient which decarburizes the weld pool and bringing into the weld pool by the rearwardmost electrode a deoxidizing ingredient which deoxidizes the weld pool after it has been oxidized by the forwardmost electrode.

A further purpose in the process just described is to introduce into the weld pool alloying ingredients in addition to deoxidizing ingredients from the rearwardmost electrode.

A further purpose is to employ a basic oxidizing flux in the core of the forwardmost electrode and a basic deoxidizing flux in the core of the rearwardmost electrode, but to maintain a nonbasic overall character of the flux by introducing a relative excess of non-basic flux into the slag.

A further purpose is to employ a further rear electrode of iron alloy and to pass current to the work from such further rear electrode, said further rear electrode being a solid electrode of iron alloy having an alloying ingredients from 0.3 to 2% of manganese and from 0.1 to 2% of silicon.

A further purpose is to locate two tubular rear electrodes symmetrically, each of said tubular rear electrodes having in its flux core basic flux and deoxidizers, the distance apart of thse two tubular rear electrodes being between 5 and 25 mm..

A further purpose is to maintain an electric current between an electrode and the steel parts to produce a weld pool of molten metal, to deposit granular flux on the weld pool to submerge the arc and thereby form a slag layer on the weld pool, and to purge the granular flux with a gas to remove air filling the voids between the granules of flux deposited on the weld pool.

A further purpose in the process just described is to blow a stream of carbon dioxide into the layer of granules of flux on the weld pool by a nozzle whose forward end penetrates into the layer of flux granules.

A further purpose is to pass current to the work from a tubular electrode having a flux core and to introduce carbon dioxide at the weld position between the granules of flux by evolving carbon dioxide from a carbonate present in the flux core.

A further purpose in electroslag welding of low carbon and low alloy steel is to maintain a body of slag molten by passing an electric current through the slag, by the heat from the slag melting metal to form a weld pool, to introduce progressive increments of oxidizing granular flux into the slag and thereby to oxidize the metal of the weld pool and decarburize the metal, to pass current to the weld pool from an electrode whcih has a flux core and to introduce from the flux core deoxidizing ingredients which reduce the iron oxide introduced into the weld pool during decarburizing. In one preferred embodiment the slag is maintained in a non-basic condition by the granular flux which is acid, while on the other hand the flux core of the tubular electrode is basic.

A further purpose is electroslag welding of low carbon and low alloy steels, in which a major portion of the slag used during the operation of welding is introduced by tubular electrodes, is to maintain a body of slag molten by passing electric current through the slag and thereby melting metal to form a weld pool, passing electric current to the weld pool from at least one tubular electrode having a flux core containing an oxidizing ingredient, and passing electric current to the weld pool from at least one other tubular electrode having a flux core containing deoxidizer, the electrode having the oxidizing flux core having a relatively thin metal wall and relatively large proportion of flux content, and the electrode having the flux core which contains deoxidizer having a relatively thick metal wall and relatively smaller proportion of flux content.

A further purpose in the process just referred to is to apply a ratio of the cross section of the conductive sheath of the electrode having the oxidizing character, with respect to the cross section of the conductive sheath of the electrode having a deoxidizing character of less than 0.7.

A further purpose in the processes referred to above is to utilize a tubular metallic electrode which contains both deoxidizing ingredients and also alloying elements.

A further purpose is to employ in the processes previously referred to a tubular metallic electrode which has a flux core containing oxidizing ingredients and which produces a non-basic slag, and a tubular metallic electrode containing deoxidizers which has a flux core which produces a basic slag.

A further purpose in electroslag welding of low carbon and low alloy steels is to pass electric current through a slag to maintain the slag molten in a slag pool, introduce metal into the slag and thereby melt the metal to form a weld pool, pass electric current to the weld pool from at least one flux cored tubular metallic electrode containing deoxidizers, to blow an oxidizing gas on the surface of the slag pool to oxidize the same, and to bring to the slag a relatively large mass of independent flux as compared to the smaller quantity from the electrode in order to replenish the slag pool.

A further purpose in the process just referred to is to use a mass of slag covering the weld pool which is either weakly acid or semi-basic.

A further purpose in the processes above described is to use a tubular metallic electrode which includes both deoxidizing ingredients and basic flux forming ingredients.

A further purpose in the process previously described is to bring in deoxidizing ingredients with alloying ingredients.

A further purpose in electroslag welding of low carbon and low alloy steels is to remain a non-basic slag pool molten by passing electric current through a body of slag from at least one solid steel electrode which plunges into the slag, said steel electrode containing at least 2% of deoxidizer alloyed with the steel, to produce a molten weld pool by melting metal containing deoxidizer from said steel electrode, and to oxidize the top surface of the slag pool by blowing an oxidizing gas into contact with the slag pool.

A further purpose in electroslag welding of carbon steel and low alloy steel is to pass electric current from a solid steel electrode through a molten non-basic slag pool into which the electrode plunges and thereby maintain a pool of molten weld metal beneath the molten slag pool by melting metal of the electrode, to feed to the slag pool flux independently from the electrode from an external source of granulated flux to produce slag having a basicity index lower than 1.2, said electrode containing at least 1.2% by weight of deoxidizer in metallic form of the class consisting of silicon, titanium, aluminum and magnesium, and at least 0.8% by weight of metallic manganese, and to blow an oxidizing gas constantly in contact with the upper surface of the molten slage pool.

A further purpose is to employ suitable apparatus referred to herein to carry out the processes above referred to.

Further purposes appear in the specification and in the claims.

The drawings illustrate the welding processes of the invention and the apparatus which will desirably be used.

The present invention concerns processes and mechanism to make welded joints. In most cases these inventions apply when the liquid slag normally used is non-basic.

In the present discussion, the term "non basic slag" is intended to cover those slags which welders have generally called acid slags, neutral slags, and semi-basic slags. In the case of sumberged arc welding and electroslag welding, these slags all have a basicity index which is lower than 1.4%. In the case of neutral slags the basicity index is about 1. In the case of semi-basic or acid slags the basicity index is respectively above or under the basicity index of neutral slags.

By basicity index is meant the ratio $B/A$ where B expresses the percentage by weight of CaO plus MgO plus BaO plus $K_2O$ plus $Na_2O$ plus $Li_2O$ plus $CaF_2$ plus one-half of the MnO, while A expresses the percentage by weight of $SiO_2$ plus one-half of the group $Al_2O_3$ plus $TiO_2$ plus $ZrO_2$.

There are several electrode welding processes which employ fushion and operate with molten slags covering the molten weld pool and covering the metal during solidification, for example manual arc welding with coated welding electrodes, submerged arc welding, arc welding under a gaseous protective atmosphere and using cored electrodes, and welding under molten slag where the heat is developed in the slag, which is usually known as the electroslag process.

These slags exert a great influence upon the quality of the weld metal which is deposited. The intention is to produce a composition such that the weld metal will have great ductility.

It is known in the art that the best mechanical properties in manual electric arc welding of iron and steel are obtained when slags of the basic type are used, that is, slags containing relatively large quantities of ingredients such as $CaF_2$, MgO, CaO, BaO, MnO and the like and relatively few acid ingredients such as $SiO_2$, $TiO_2$, $Al_2O_3$ and the like.

However, in some processes such as the submerged arc and electroslag process the slag must possess certain physical properties in addition to its metallurgical effects.

In the submerged arc welding process, the slag must contribute to the production of a suitable shape on the weld bead, and must maintain a certain fluidity for a long time in order to permit the escape of gases which come off the metal during solidification, make the arc invisible, and the like.

In the electroslag process, an intense electric current flows directly through the slag and the slag must have enough electrical resistance to develop the $RI^2$ heating necessary to fuse the edges of the work to be welded. The slag must also create a tight joint between the copper shoes on the one hand, and the solidified metal and the faces of the work pieces adjacent to these shoes, on the other hand.

In this case, the physical function of the slag imposes elements of composition which are not always excellent from the metallurgical standpoint.

For instance, in submerged arc welding and in electroslag welding, it is very convenient, and therefore very common, to use slags which are called acid or neutral and which have a content of $SiO_2$ which is greater than 35% by weight. These slags do not permit the deposit of a very pure and very ductile metal. This is why the impact strength at low temperatures of welds obtained by these processes are generally low.

The present invention makes it possible to improve the mechanical properties of submerged arc and electroslag welds while retaining the advantages of low cost and improved technology from the use of acid or neutral slags.

In the process of the present invention, a non-basic slag is formed for this purpose by mixing a large amount of materials which form a non-basic slag by their fusion above the weld pool, together with a small amount of materials which would form a basic slag by their separate fusion. The materials which would form a basic slag are fed by at least one tubular metallic electrode as it melts, the proportion of basic slag forming materials supplied by the melting of the tubular electrode being small enough so that after the mixing with the non-basic slag, the resultant slag still remains non-basic.

It will be evident that the basic slag forming material supplied from the flux core when the tip of the electrode melts first acts alone on a large portion of the molten metal of the weld pool and later mixes with the acid ingredients of the mass of non-basic slag.

The metal which melts at the tip of the flux cored electrode reaches a very high temperature and therefore the basic slag brought into the slag mass by the electrode is extremely hot. Each liquid droplet resulting on the fusion of the flux cored metallic electrode thus consists of superheated liquid metal and liquid basic slag.

These droplets are thrown violently into the molten weld pool. The metallic portion mixes with the weld metal which is made up of a mixture of metal coming from the electrode and molten metal from melting of the work. The basic slag is thrown toward and into the liquid weld metal and subjects the weld metal to metallic reactions which purify it. The basic slag then floats up to the surface of the weld pool, where it mixes with the relatively cooler acid slag brought in from the outside, suitably in the form of granulated flux.

The final mixture of slag is an acid one, having a composition siutable for the technological requirements of the welding process and the metal being welded.

In order to show the differences from the conventional process and the advantages of the process of the invention, two submerged arc welding operations will be described, one using the conventional process and the other the process of the invention.

Butt welds were made by submerged arc between two steel plates 25 mm. thick, the steel composition being that generally known in Germany as ST52. This is an open hearth steel having the following nominal composition by weight:

| | Percent |
|---|---|
| Carbon | 0.18 |
| Silicon | 0.21 |
| Manganese | 1.2 |
| Sulphur | 0.03 |
| Phosphorus | 0.016 |
| Balance, iron. | |

The edges of both plates, facing each other, were chamfered in a Y shape with the inclined faces forming an included angle of 70° while the straight faces were 4 mm. high.

In conventional submerged arc welding, granulated flux commonly used in the trade and having a composition by weight as follows was employed:

| | Percent |
|---|---|
| $SiO_2$ | 45 |
| $Al_2O_3$ | 3 |
| $CaF_2$ | 5 |
| MnO | 35 |
| MgO | 4 |
| CaO | 5 |
| Miscellaneous | 3 |

This flux has a basicity index of 0.7% and contains about 33% oxygen by weight. It looks like a colored granulated glass.

Welding was performed in five passes in the manner shown in Table I herein, using a solid steel bare electrode of 4.8 mm. diameter connected to the positive pole of a source of D.C. current.

Table I

| Passes | Location | Intensity amperes | Welding voltage | Welding speed |
|---|---|---|---|---|
| First | Center of joint | 700 | 31 to 35 | ¹ 50 |
| Second | do | 550 | 30 to 34 | ¹ 40 |
| Third | Toward left plate | 550 | 30 to 34 | ¹ 40 |
| Fourth | Toward right plate | 550 | 30 to 34 | ¹ 40 |
| Fifth | Center of joint | 600 | 35 to 40 | ¹ 30 |

¹ Cm./min.

In order to obtain from this granulated flux tensile strengths higher than 55 kg./mm.², the usual practice of using an electrode made of low carbon steel with 1.8 to 2% manganese and 0.09 to 0.12% carbon was adopted.

In making one meter of weld the consumption of electrode was 3.6 kilos and the consumption of flux was 4.8 kilos.

Similar steel plates were welded using the process according to the invention in which the flux was more acid than in the usual practice and had a basicity index of 0.35 and a composition by weight as follows:

| | Percent |
|---|---|
| $SiO_2$ | 56 |
| $Al_2O_3$ | 3 |
| MnO | 39 |
| Miscellaneous | 2 |

This was used as a granular flux. A flux cored electrode of 4.8 mm. external diameter was employed having a low carbon steel sheath which made up 75% of the total weight of the electrode, the sheath steel composition being as follows:

| | Percent |
|---|---|
| C | 0.06 |
| Mn | 0.20 |
| Miscellaneous | 0.10 |
| Fe, balance. | |

The core of this electrode which amounted to 25% by weight of the total electrode had a basic mixture of the following composition by weight:

| | Percent |
|---|---|
| Low carbon Ferromanganese (80% Mn and 1% C) | 8 |
| $CaF_2$ | 36 |
| MnO | 14 |
| $SiO_2$ | 8 |
| CaO | 16 |
| MgO | 14 |
| Silicomanganese (25% Si and 74% Mn, 1% C) | 3 |
| | 100 |

The basicity index of the slag forming materials in this flux core was 9, so that the flux core was highly basic.

The basic-cored electrode and the acid granular flux were used under working conditions which were the same as those set forth in Table I.

The consumption per meter of weld using the process of the invention was 4.80 kilos of flux cored electrode and 3.8 kilos of granular acid flux.

The solidified slag covering the weld specimen obtained by conventional welding of the plates is referred to in Table II as specimen A while the solidified slag covering the weld specimen according to the process of the invention as described above is referred to as specimen B. The analyses by weight are as follows:

Table II

| Components | Slag Specimen A, Percent | Slag Specimen B, Percent |
|---|---|---|
| $SiO_2$ | 41.7 | 41 |
| CaO | 5.8 | 6 |
| MgO | 4.1 | 3.6 |
| MnO | 34.4 | 33.9 |
| $Al_2O_3$ | 3.1 | 2.5 |
| FeO and miscellaneous | 7.8 | 8 |

The basicity index for slag speciment A was 0.70 and that for slag specimen B was 0.75.

The weld specimens were machined to make impact strength specimens of the keyhole Charpy UF type and of the V notch Charpy V type, transverse to the weld bead, for both the conventional weld and the weld of the invention. Each of these test bars was located in the plane at the mid-thickness of the plates, with the notch perpendicular to the large faces of the plates.

The Charpy UF bars were tested at a temperature of 20° C. and the Charpy V bars were tested at minus 10° C., minus 20° C. and minus 30° C. Some of the Charpy UF bars were cold worked 10% by compression and aged for two hours at 25° C. The results in each case for averages of five test specimens are given in Table III. Again the specimens from the prior art welding technique are designated A and those from the welding according to the present invention are designated as B.

Table III

| Metal condition | Charpy UF 20° C. | Charpy V −10° C. | Charpy V −20° C. | Charpy V −30° C. | Charpy UF 20° C. |
|---|---|---|---|---|---|
| | As welded | As welded | As welded | As welded | Cold worked and aged |
| A Specimen, Kgm./mm.$^2$ | 7.30 | 3.86 | 2.60 | 1.76 | 3.13 |
| B Specimen, Kgm./mm.$^2$ | 12.92 | 6.51 | 4.46 | 3.60 | 6.92 |

The weld beads for specimens A and B were comparable in appearance. This is explained by the fact that the final slag after welding was practically the same in both cases as shown in Table II.

In spite of this fact, the cold-brittleness of specimen B was much lower than that of specimen A as shown in Table III.

Many comparative tests were made in submerged arc welding and in electroslag welding between the conventional process and the process of the present invention. In all cases, the use of composite or flux cored electrodes containing basic materials and alkaline or alkaline-earth fluorides, in combinations with an external source of acid granular flux, makes it possible to considerably improve the ductility of the weld bead with all other conditions remaining unchanged.

Instead of using a basic electrode having the precise core composition mentioned above, a basic electrode having a different core composition by weight as follows can be used in any of the processes under discussion:

| | Percent |
|---|---|
| Low carbon ferromanganese (80% Mn and 1% C) | 6 to 11 |
| $CaF_2$ | 30 to 50 |
| MnO | 10 to 18 |
| $SiO_2$ | up to 16 |
| CaO plus MgO | 10 to 30 |
| Silicomanganese (25% Si, 74% Mn, 1% C) | 1 to 2 |
| Miscellaneous | up to 6 |
| | 100 |

It is preferred to utilize this core in a proportion between 20 and 36% of the total weight of the electrode.

The following composition is used for the acid type flux which is brought to the weld pool independently from the electrode, suitably by supplying powdered flux:

| | Percent |
|---|---|
| $SiO_2$ | 45 to 65 |
| $Al_2O_3$ | up to 6 |
| MnO | 30 to 50 |
| Miscellaneous | up to 4 |

It will be evident that the lower the carbon content in weld beads of low carbon and low alloy steels the better the ductility.

For this reason the electrodes used are generally very low in carbon. However, because of dilution by the base metal, in which the carbon content often exceeds 0.20%, it is difficult to obtain welded joints having a very low carbon content in conventional welding by the submerged arc process. After oxidizing slags were used in conventional submerged arc welding, high contents of iron oxide are introduced into the weld bead and its low temperature ductility is poor. In the present invention, however, it is possible to get lower carbon content in the weld pool and then to further deoxidize the molten metal which is then low in carbon before the weld bead solidifies.

With this purpose in mind in submerged arc welding of low carbon and low alloy steels, I use a tubular electrode having a core containing oxidizing ingredients to decarburize the weld pool on the one hand, and on the other hand I use a granular flux of deoxidizing character which operates behind the electrode as the weld advances, deoxidizing the weld pool which was oxidized by the flux introduced through the flux cored electrode during decarburization of the weld pool.

In the submerged arc process in accordance with the invention, the base metal is melted by the electric arc which strikes the tip of the electrode and contacts the metal which is still in solid condition ahead of the weld pool.

The base metal, which becomes molten and then superheated, mixes with the metal from the electrode, and later cools slowly under a layer of molten slag and solidifies. If the work pieces are made for instance of steel ST52 as above described having a nominal carbon content of 0.18% the metal of the weld bead contains too much carbon to have good ductility in the case of the conventional submerged arc welding process.

This disadvantage can be overcome in the process of the invention by incorporating in the electrode a sufficient amount of oxidising ingredients, for example iron oxide. The carbon of the base metal is then burned out as soon as the base metal melts and passes off as carbon monoxide. The oxidized metal which enters the weld pool behind the advancing electrode now reacts with a covering slag before it solidifies.

Since the flux brought to the pool independently from the electrode has in this aspect of the invention a deoxidizing character, either because it constitutes a partially reduced manganese silicate or because it is an agglomerated mixture of vitreous calcium and manganese silicate with deoxidizers such as silico-manganese, ferrosilicon, ferrotitanium and other ferroalloys, the liquid metal left behind the electrode is progressively deoxidized and the products of the deoxidation float up to the surface where they join the slag. A weld metal can thus be obtained which is perfectly deoxidized and has a carbon content less than 0.05%.

Examples of deoxidizing granular fluxes are as follows:

*Flux with a partially reduced manganese silicate*

|  | Percent |
|---|---|
| $SiO_2$ | 50 |
| MnO | 40 |
| $Al_2O_3$ | 6 |
| Miscellaneous | 4 |

*Agglomerated mixture of vitreous calcium and manganese silicate wih deoxidizers*

|  | Percent |
|---|---|
| $SiO_2$ | 57 |
| MnO | 15 |
| CaO | 15 |
| $CaF_2$ | 2 |
| Ferro-alloys | 9 |
| Miscellaneous | 2 |

Figure 3:
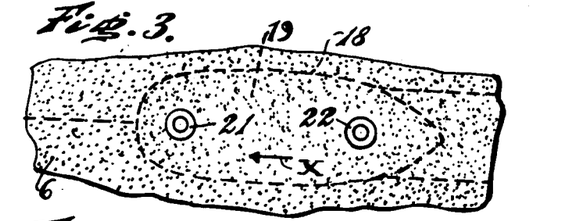
FIGURE 3 is a diagrammatic top plan view looking down on the molten slag layer and the molten weld pool, showing by an arrow the direction in which the welding equipment is moving longitudinally of the weld seam, and also showing a forward electrode and a trailing electrode both of which have flux cores.

A fully deoxidized low carbon weld metal can also be created without using a flux containing deoxidizing ingredients when operating as follows:

Two electrodes as shown in FIGURE 3 spaced from each other in the direction of welding travel (arrow X), but nevertheless placed sufficiently close to each other to produce only a single weld pool 20, with a flux pool 18 on top, can be used with one electrode 21 ahead in the direction of welding progression bringing to the weld pool oxidizing ingredients to decarburize the pool while electrode 22 behind brings to the weld pool deoxidizing ingredients to deoxidize the weld pool already oxidized by the first electrode.

A composition for the flux core in electrode 21 is: $SiO_2$ 50%, $MnO_2$ 15%, $Fe_3O_4$ 23%, CaO 3%, MgO 2%, $CaF_2$ 3%, $Al_2O_3$ 3%, miscellaneous 1%.

A composition for the flux core in electrode 22 is: ferromanganese 10%, $CaF_2$ 38%, MnO 10%, $SiO_2$ 8%, CaO 15%, MgO 12%, ferrosilicon 5.5%, miscellaneous 1.5%.

Both electrodes are supplied with current either in parallel from a single source of current or independently of one another from separate sources of current.

These electrodes are suitably spaced 5 to 40 mm., in the direction of weld travel. The forward electrode 21 is for instance an electrode having a core containing a large amount of oxidizing ingredients, for example iron oxide. This electrode melts the base metal and burns out the carbon. The weld metal resulting from its action is very low in carbon but it has an excessive content of oxygen.

The second electrode 22 in the direction of weld travel is for instance an electrode having a core containing in addition to the flux, the alloying elements, including manganese, and in proper amount, energetic deoxidizer such as aluminum, ferrosilicon, carbonless ferrotitanium, ferromanganese and the like.

The metal brought into the weld pool by this second electrode 22 which is toward the rear of the weld pool completely deoxidizes the weld metal of the first electrode because of the presence of the deoxidizers in the second electrode 22 and also brings into the weld pool alloying elements which may be needed in the particular case. The products of deoxidation and the slag 18 formed float up to the surface of the pool where they mix with the mass of slag resulting from fusion of granular flux poured over the pool outside of the electrode.

The alternating oxidizing and deoxidizing actions of the electrodes upon the molten weld pool in this form of submerged arc welding give particularly favorable results when these electrodes have a core of basic character, and when the mass of flux poured over the weld pool outside of the electrodes produces by melting of the mass alone a non-basic slag, the slag being furthermore such that after mixing with the basic slag formed by the fusion of both electrodes the resulting mixed slag still has a non-basic character.

The second basic electrode 22 in the direction of weld travel which also contains the deoxidizers not only has the effect of deoxidizing the decarburized weld metal produced by the first basic electrode 21 but also acts to purify this weld metal under the action of the basic slag.

Figures 4, 5, 6, 7:
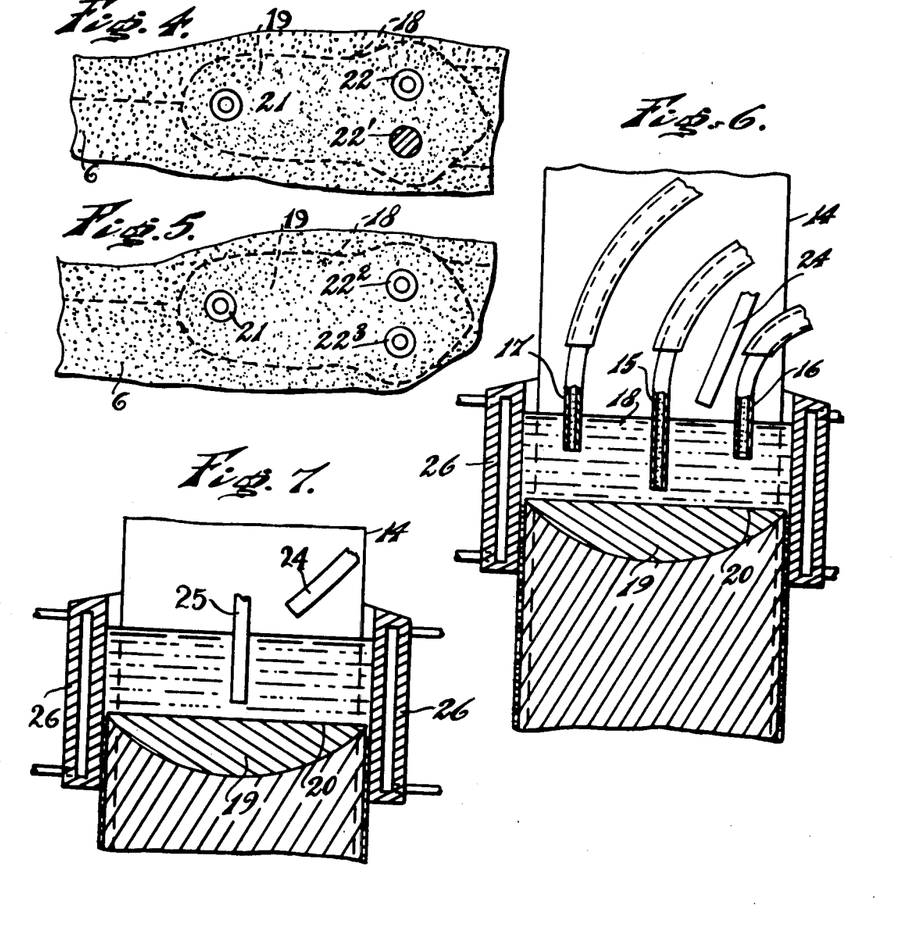
FIGURE 4 is a view similar to FIGURE 3, but illustrating two trailing electrodes, one of which is a solid electrode and the other of which is a flux cored electrode.
FIGURE 5 is a view similar to FIGURE 3 showing one forward electrode and two trailing electrodes both of which are flux cored electrodes.
FIGURE 6 is a view similar to FIGURE 2, illustrating a nozzle for supplying oxidizing gas to the surface of the slag layer.
FIGURE 7 is a vew similar to FIGURE 2 showing the use of a solid welding electrode as distinguished from a flux cored electrode.

Instead of using behind the electrode 21, which has a basic and oxidizing character, a second electrode 22 which has a basic and deoxidizing character, the second electrode 22 can be replaced by two electrodes 22 and 22' as shown in FIGURE 4, one of which 22 is tubular and contains a basic slag and optionally contains deoxidizers, while the other of which 22' is a solid electrode and contains from 0.3 to 2% of manganese and from 0.05 to 2% of silicon.

An example of composition for electrode 22' is: Mn 1.25%, Si 1%, Fe 97.75%.

It is also a suitable alternative to replace the second or rear electrode 22 which has a basic and deoxidizing character by two tubular electrodes $22^2$ and $22^3$ as shown in FIGURE 5, similar to one another each of which has a basic slag and deoxidizers, both electrodes being located at the same distance behind the first electrode, symmetrically with respect to the path of the first electrode and with a spacing 5 to 25 mm. from one another.

The proportion of slag formed from the electrodes, with respect to the acid or neutral slag brought to the weld pool independently from the electrodes, is such that the final slag resulting from the mixing still is of non-basic character.

One can obtain through this process a perfectly deoxidized steel having a carbon content of less than 0.04%.

Another way to improve the quality of the weld metal deposited by the submerged arc welding process consists in acting upon the atmosphere in the layer of flux granules covering the weld seam to be welded, by projecting into this layer a gas other than air.

By purging the air from the layer of granular flux, you can obtain a weld metal which is very low in oxygen.

With this purpose, various gases can be used which do not harm the quality of the weld metal. For instance, one can blow argon or a mixture of argon and oxygen or of argon and carbon dioxide or a mixture or argon, oxygen and carbon dioxide in any desired proportions. Industrially pure carbon dioxide can also be used. At the same time that these gases eliminate nitrogen, they also purge from the weld the carbon dioxide resulting from the first reactions involving the removal of carbon in the steel. These gases may produce other effects if desired. Carbon dioxide increases the penetration of the arc in the base metal, while oxygen broadens the weld pool. In all cases where an oxidizing gas is blown into the layer of granules on the weld pool, the gas contributes to decarburize the weld pool to a considerable depth.

Figure 1:
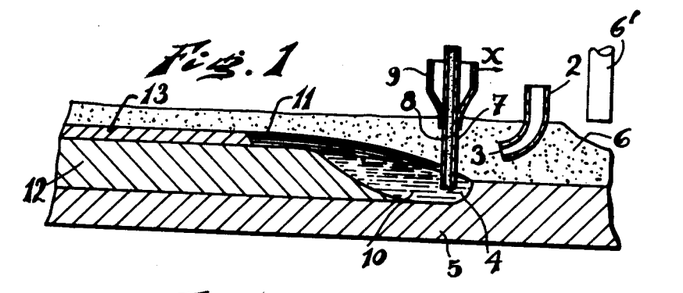
FIGURE 1 is a central vertical section along a weld seam during welding by the submerged arc welding process showing application of granular flux and blowing of a gaseous atmosphere on said granular flux.

FIGURE 1 illustrates a mechanism to create a gaseous atmosphere in the layer of granular flux.

FIGURE 1 shows a nozzle 2 whose outlet 3 is directing toward the weld site 4 a gaseous mixture which is free from nitrogen. The joint between the parts to be welded, one of which is shown at 5, is covered by a layer of a granular flux 6 introduced through a feed tube 6′, and the fusion of the flux will create a slag.

The welding electrode 7 is a tubular electrode which contains a core of slag forming materials and deoxidizers in the interior. The electrode has a metallic tube or jacket 8 and moves forward as it progresses through an electrode guide 9. The electrode and the nozzle 2 are progressed together in the direction of the arrow X parallel to the joint being welded. An arc strikes in the layer of the granular flux 6 between the tip of the electrode 7 and the work to be welded. The molten metal pool is produced and it is covered by a molten slag layer 11. The weld bead 12 results and it is covered by a solidified slag layer 13.

In experiments with welding plain carbon steel having 0.2% carbon, it has been found that an output of gas of 15 liters per minute suffices to eliminate air and carbon dioxide. If the gas used is a mixture of 50% by volume of $CO_2$ and 50% of $O_2$, the carbon content of the steel weld metal can be reduced to less than 0.04%, assuring at the same time good deoxidation by virtue of the action of the composite electrode. A granular acid flux used in the prior art can be employed. If the gas used is 100% $CO_2$ decarburizing is less pronounced and the carbon content of the weld bead remains at about 0.06% but the arc is more penetrating. If more oxygen is to be used with the carbon dioxide, more deoxidizers should be employed.

In case it is desired to introduce carbon dioxide to the weld site by means of the tubular electrode, this is effectively accomplished by using a flux core in the electrode which contains substantial quantities of calcium carbonate, manganese carbonate or iron carbonate or two or more of these carbonates. They can be used in a percentage by weight of 3 to 5% of the flux core of the electrode. An example of such a flux is as follows: an agglomerated mixture of vitreous calcium and manganese silicate with deoxidizers comprising in percent by weight of the core $SiO_2$ 54%, MnO 15%, CaO 14%, $CaF_2$ 2%, ferro-alloys 9%, miscellaneous 2%, this agglomerated mixture being itself mixed with 4% of calcium carbonate.

In all cases where nitrogen is excluded from the granulated flux by blowing a gas into the granulated flux, it is advantageous to use a non-basic granulated flux and basic flux cored electrodes.

In the electroslag process, the base metal is melted by the erosive action of a superheated liquid slag through which the current flows. This metal thus melted flows by gravity into the weld pool where it mixes with liquid metal originating from the electrode or electrodes, and solidifies.

When low carbon or low alloy steel is welded by the electroslag process, the operation is to advantage performed as follows to reduce the carbon content of the weld metal while obtaining excellent dioxidation.

According to the invention a very deoxidizing granular flux is used, which may to advantage have the following composition by weight:

| | Percent |
|---|---|
| $SiO_2$ | 40 |
| $Al_2O_3$ | 2.8 |
| $CaF_2$ | 4.5 |
| $MnO+MnO_2$ | 42.5 |
| MgO | 3.7 |
| CaO | 4.5 |
| Miscellaneous | 2 |

This flux forms a slag which oxidizes the carbon in the molten base metal and removes the carbon from the molten slag pool in the form of oxide of carbon.

By a very oxidizing granular flux is meant a flux whose oxygen content has artificially been increased during manufacture.

For example the prior art flux whose composition has been given just before Table I and which has an oxygen content of 33% can be made very oxidizing if it is treated with oxygen blown into the furnace on the preferably molten flux during manufacture of the flux in an electric furnace until the final oxygen content is 40%.

The metal which has been decarburized and oxidized by the very oxidizing granular flux mixes with metal originating from the electrode. The electrode is a tubular electrode whose core contains slag forming ingredients together with a high content of deoxidizing ingredients such as ferrosilicon, ferrotitanium, silicomanganese or ferromanganese.

The iron oxide from the decarburized base metal is reduced, and the oxygen is removed from the weld metal in the form of manganese silicate or titanate mixing with the molten slag.

The very oxidizing granular flux covering the molten weld pool is advantageously an acid flux while the core of the tubular electrode bringing in the deoxidizing agents is basic.

By this means it is possible to deposit a weld metal which is perfectly deoxidized and which has a carbon content of less than 0.07%.

In a variation of the electroslag welding process applied to low carbon or low alloy steel, in which cores of various compositions are supplied by tubular electrodes to compensate for the major portion of the slag lost by consumption, the ingredients of an oxidizing slag to cover the molten weld pool are supplied by at least one tubular electrode having a thin wall surrounding a voluminous core containing flux and optionally iron powder, while at least one other tubular electrode contains deoxidizers and optionally alloying ingredients, where the proportion of iron in the sheath is larger than in the other electrode or electrodes.

The ratio of the cross section of the conductive sheath of those electrodes having an oxidizing core, to the cross section of the conductive sheath of those electrodes having a deoxidizing core is less than 0.7.

Figure 2:
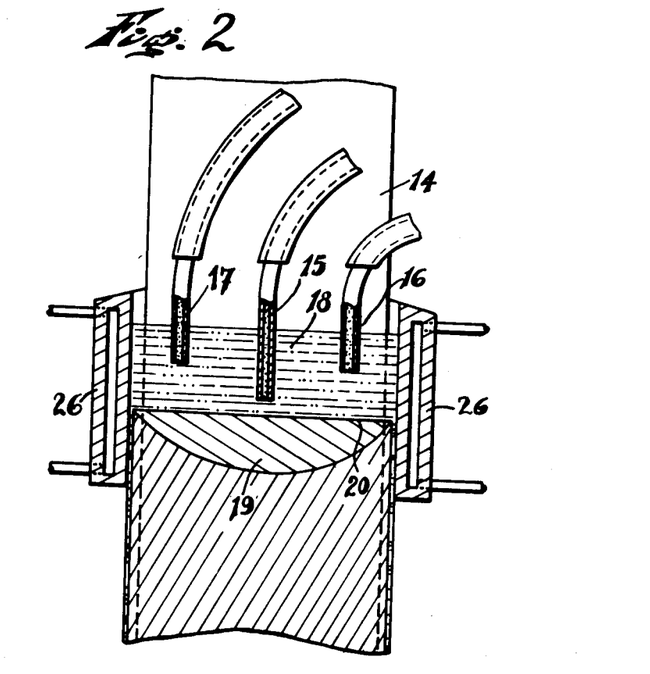
FIGURE 2 is a vertical section perpendicular to the large faces of thick vertical plates to be welded by the electroslag process according to one of the invention.

In FIGURE 2 which shows in vertical section perpendicular to the large face of the thick plates to be welded the site of a welding seam obtained by this process, one can see for instance near the middle of the thickness of the plates, one of which is designated 14, a tubular electrode 15 having a thick wall supplying at the welding site a relatively large amount of weld metal. Water cooled shoes are shown at 26. This electrode includes deoxidizers and optionally alloying elements in the core and the core has slag forming compounds which are predominately basic.

Other electrodes 16 and 17 have a metallic sheath which is much thinner than that of the electrode 15 and the electrodes 16 and 17 have much more voluminous cores. The cores of the electrodes 16 and 17 mainly contain oxidizing ingredients such as iron oxide or iron carbonate, for example, and acid slagging ingredients such as silica, manganese silicate glasses, calcium silico-aluminate, rutile and the like. Optionally the cores of the electrodes 16 and 17 may also contain iron powder.

Since the electrodes which have an oxidizing core have a much thinner sheath than those which have a deoxidizing basic core, the electrodes with an oxidizing core melt much faster than the electrodes which have a basic core when they penetrate into the molten slag pool 18 covering the molten weld pool 19 of FIGURE 2. As a result, if, for instance, the slag pool is 55 mm. deep, the tip of the basic deoxidizing electrode 15 will locate itself at some 10 mm. above the surface 20 of the liquid steel 19, while the tips of the acid oxidizing electrodes 16 and 17 will locate themselves at about 30 mm. above the surface 20 of the liquid steel. Therefore, despite the violent whirling of the slag pool, the slag pool is somewhat heterogeneous, with the upper portion notably more acid and more oxidized than the lower and center portion which is notably more basic and less oxidized, by contrast with the center portion of the molten weld pool 20. Thus, it is possible to partially burn out the carbon of the base metal, while assuring good cleaning and good deoxidizing of the weld metal, particularly in the middle of the weld where the ductility is usually the poorest.

To decarburize weld metal in the case of electroslag welding of low carbon or low alloy steel, one can operate as follows:

At least one tubular electrode is used, which contains at least 2% of deoxidizers. Furthermore, at the welding site relatively large amounts of materials forming a slag by their own fusion upon the weld pool are brought in, while the surface of the slag pool is oxidized by blowing an oxidizing gas.

FIGURE 6 shows an installation of this character which has a nozzle 24 directed on the slag pool to blow in a suitable oxidizing gas such as carbon dioxide, a mixture of carbon dioxide and oxygen, or air.

The slag which has been superficially oxidized erodes, melts, decarburizes and oxidizes the base metal. The base metal flows into the molten weld pool where it mixes with the highly deoxidized metal originating from the fusion of those electrodes having deoxidizers in the cores. The metal finally solidified is low in carbon and sufficiently deoxidized.

If the slag which is used is not too acid in character, and for instance is semi-basic, the mechanical properties of the weld are still better.

In a variant of the invention where the electrode containing deoxidizers is a tubular electrode having a core of basic flux, the results are still further improved.

A decarburized and deoxidized molten weld pool can be obtained by the electroslag process by proceeding in a manner similar to the one just described, but without using one or more tubular electrodes to bring the current into the large mass of non-basic slag covering the molten weld pool. Instead an electrode of alloy steel which contains in the steel itself at least 2% of deoxidizers is used, as shown in FIGURE 7 while the top surface of the slag pool is oxidized by blowing an oxidizing gas over it.

FIGURE 7 illustrates this solid electrode containing alloyed deoxidizers at 25, such as silicon, a combination of silicon and aluminum, aluminum, manganese or the like.

The total of the slag forming materials in this form of the invention is thus brought in as a granular flux independent from the electrode, except for the minor contributions to the slag by the deoxidizer in the electrode. The electrode contains as alloys a large amount of deoxidizers such as silicon, titanium, manganese and the like, which act as deoxidizers did in the core of the tubular electrode used in the processes described elsewhere herein.

You can again obtain electroslag welding of low carbon or low alloy steel by feeding the slag pool which covers the weld pool in electroslag welding independently from the electrode which plunges into the slag pool, using an external source of granular flux giving a slag whose basicity index is below 1.2, and constantly oxidizing the upper portion of the slag pool by blowing an oxidizing gas over its surface, and by using an electrode containing at least 1.2% of deoxidizers by weight, such as silicon, titanium, aluminum, manganese and the like, all in metal form, plus at least 0.8% of manganese.

In view of my invention and disclosure variations and modifications to meet individual whim or particular need will doubtless become evident to others skilled in the art, to obtain all or part of the benefits of my invention without copying the process shown, and I therefore claim all such insofar as they fall within the reasonable spirit and scope of my claims.

Having thus described my invention, what I claim as new and desire to secure by Letters Patent is:

1. A process of welding metals, which comprises maintaining an electric current between at least one metallic electrode and the work to be welded to cause the creation of a weld molten pool, covering said pool with a non-basic liquid slag by melting non-basic slag forming materials over the pool, and feeding to the pool at least one tubular metallic electrode which contains materials which form by fusion a basic slag, said tubular metallic electrode supplying basic slag forming materials in a proportion which is so small that the resultant slag produced by mixing the basic slag forming materials with the non-basic slag remains non-basic.

2. A process of claim 1, in which the non-basic slag forming materials by themselves produce a slag having a basicity index less than 1, and the basic slag forming materials by themselves produce a slag having a basicity index greater than 2.

3. A process of claim 1, in which the basic slag forming materials have the following composition by weight:

| | Percent |
|---|---|
| Low carbon ferromanganese (80% Mn and 1% C) | 6 to 11 |
| $CaF_2$ | 30 to 50 |
| MnO | 10 to 18 |
| $SiO_2$ | up to 16 |
| CaO plus MgO | 10 to 30 |
| Silicomanganese (25% Si, 74% Mn, 1% C) | 1 to 2 |
| Miscellaneous | up to 6 |
| | 100 | and the non-basic slag forming materials which are brought into the weld pool independently from the basic slag forming materials have the following composition by weight:

| | Percent |
|---|---|
| $SiO_2$ | 45 to 65 |
| $Al_2O_3$ | up to 6 |
| MnO | 30 to 50 |
| Miscellaneous | up to 4 |

4. A process of claim 1, which comprises passing current to the weld pool from two tubular metallic electrodes and progressing said tubular metallic electrodes in the direction of weld travel, one of said tubular metallic electrodes being relatively forward and the other being relatively toward the rear, bringing into the weld pool from the forwardmost electrode oxidizing ingredients in a basic flux which decarburizes the weld pool, and bringing into the weld pool from the rearwardmost electrode deoxidizing ingredients in a basic flux which deoxidize the weld pool which has been oxidized by the forwardmost electrode.

5. A process of claim 4, which comprises passing current to the work for a further rear metallic electrode, said further rear metallic electrode being a solid electrode of iron alloy having as alloying ingredients from 0.3 to 2% of manganese and from 0.05 to 2% of silicon.

6. A process of claim 4, which compirses arcing to two tubular rear metallic electrodes each of which has in its flux core basic flux and deoxidizers, said rear metallic electrodes being located symmetrically with respect to the base of the weld, their distance apart being between 5 and 25 millimeters.

7. A process for submerged arc welding of low carbon and low alloy steels, which comprises maintaining an electric arc to work and thus producing a weld pool, at least one electrode for said arc being a tubular metallic electrode having a core which contains oxidizing ingredients, decarburizing the weld pool by said oxidizing ingredients and supplying granular flux of deoxidizing character which operates on the pool to deoxidize the weld pool behind said electrode after the weld pool has been oxidized by the electrode in decarburizing the weld pool.

8. A process of submerged arc welding of low carbon and low alloy steels, which comprises arcing to the work from two metallic electrodes, progressing said metallic electrodes relatively to the work with the metallic electrodes spaced apart in the direction of weld travel but close enough together to form a single weld pool, each of said metallic electrodes having a flux core, bringing into the weld pool by the forwardmost metallic electrode oxidizing ingredients which decarburize the weld pool, and bringing into the weld pool by the rearwardmost metallic electrode deoxidizing ingredients which deoxidize the weld pool after it has been oxidized by the forwardmost electrode.

9. A process of claim 8, which comprises introducing into the weld pool alloying ingredients in addition to deoxidizing ingredients from the rearwardmost metallic electrode.

10. A process of claim 8, which comprises introducing basic flux from the cores of both of the metallic electrodes while maintaining a slag of non-basic character which continuously remains such because of the small quantity of additions of basic character.

11. A process of claim 10, which comprises passing current to the work from a further rear metallic electrode, said further rear metallic electrode being a solid electrode of iron alloy having as alloying ingredients from 0.3 to 2% of manganese and from 0.1 to 2% of silicon.

12. A process of claim 10, which comprises arcing to two tubular rear metallic electrodes each of which has in its flux core basic flux and deoxidizers, said rear metallic electrodes being located symmetrically with respect to the base of the weld, their distance apart being between 5 and 25 millimeters.

13. A process of electric arc welding of steel parts, which comprises maintaining an electric arc between an electrode and the steel parts to produce a weld pool of molten metal, depositing granular flux on the weld pool to submerge the arc and thereby forming a slag layer on the weld pool, and purging the granular flux with a gas to remove air filling the voids between the granules of flux deposited on the weld pool.

14. A process of claim 13, which comprises blowing an oxidizing gas into the layer of granules of flux on the weld pool.

15. A process of claim 13, which comprises blowing carbon dioxide gas into the layer of granules of flux on the weld pool.

16. A process of claim 13, which comprises blowing a stream of carbon dioxide gas between the granules of flux on the weld pool by means of a nozzle whose forward end penetrates into the layer of flux granules.

17. A process of electroslag welding of low carbon and low alloy steel, which comprises maintaining a body of slag molten by passing an electric current through the slag, by the heat from the slag melting metal to form a weld pool, introducing progressive increments of oxidizing granular flux into the slag and thereby oxidizing the metal of the weld pool and decarburizing the metal, passing electric current to the weld pool from a tubular metallic electrode which has a flux core, and introducing from the flux core deoxidizing ingredients which reduce the iron oxide in the weld pool during decarburizing.

18. The process of claim 17, which comprises maintaining the slag non-basic by an acid granular flux notwithstanding that the flux core of the tubular metallic electrode is basic.

19. A process of claim 18, in which the tubular metallic electrode containing deoxidizing ingredients also contains alloying elements.

20. A process of electroslag welding of low carbon and low alloy steels, in which a major portion of the slag used during the operation of welding is introduced by tubular metallic electrodes, which comprise maintaining a body of slag molten by passing electric current through the slag and thereby melting metal to form a weld pool, passing electric current to the weld pool from at least one tubular metallic electrode having a flux core containing an oxidizing ingredient, and passing electric current to the weld pool from at least one other tubular metallic electrode having a flux core containing deoxidizer, the electrode having the oxidizing flux core having a relatively thin metal wall and relatively large proportion of flux content and the electrode having the flux core which contains deoxidizer having a relatively thick metal wall and relatively smaller proportion of flux content.

21. A process of claim 20, in which the ratio of the cross section of the conductive sheath of the electrode having an oxidizing character, with respect to the cross section of the conductive sheath of the electrode having a deoxidizing character is less than 0.7.

22. A process of claim 20, in which the tubular metallic electrode which contains deoxidizing ingredients also contains alloying elements.

23. A process of claim 20, in which the tubular metallic electrode which has flux core which contains oxidizing ingredients produces a non-basic slag while the tubular metallic electrode containing deoxidizer has a flux core which produces a basic slag.

24. A process of electroslag welding of low carbon and low alloy steels, which comprises passing electric current through a slag to maintain the slag molten, introducing metal into the slag and thereby melting the metal to form a weld pool, passing electric current to the weld pool from at least one flux cored tubular metallic electrode containing deoxidizers, blowing oxidizing gas on the surface of the slag pool to oxidize the same, and bringing to the slag a relatively large mass of independent flux as compared to the smaller quantity from the electrode in order to replenish the slag pool.

25. A process of claim 24, in which the tubular metallic electrode introducing the deoxidizing ingredient has a basic core.

26. A process of claim 24, in which the metallic electrode which brings in the deoxidizing ingredient also contains alloying elements.

27. A process of claim 24, in which the mass of slag covering the metallic weld pool is weakly acid.

28. A process of claim 24, in which the mass of slag covering the metallic weld pool is semi-basic.

29. A process of claim 28, in which the tubular metallic electrode introducing the deoxidizing ingredient has a basic core.

30. A process of electroslag welding of low carbon and low alloy steels, which comprises maintaining a non-basic slag pool molten by passing electric current through a body of slag from at least one solid steel electrode which plunges into the slag, said steel electrode containing at least 2% of deoxidizer alloyed with the steel, producing a molten weld pool by melting metal containing deoxidizer from said steel electrode, and oxidizing the top surface of the slag pool by blowing an oxidizing gas into contact with the slag pool.

31. A process of electroslag welding of carbon steel and low alloy steel, which comprises passing electric current from a solid steel electrode through a molten non-basic slag pool into which the electrode plunges and thereby maintaining a pool of molten weld metal beneath the molten slag pool by melting metal of the electrode, feeding to the slag pool flux independently from the electrode from an external source of granulated flux to produce slag having a basicity index lower than 1.2, said electrode containing at least 1.2% by weight of deoxidizer in metallic form of the class consisting of silicon, titanium, aluminum and magnesium and at least 0.8% by weight of metallic manganese, and blowing an oxidizing gas constantly in contact with the upper surface of the molten slag pool.

32. A welding electrode having a steel sheath and a hollow interior having a basic core of the following composition:

| | Percent |
|---|---|
| Low carbon ferromanganese (80% Mn and 1% C) | 6 to 11 |
| CaF₂ | 30 to 50 |
| MnO | 10 to 18 |
| SiO₂ | up to 16 |
| CaO plus MgO | 10 to 30 |
| Silicomanganese (25% Si, 74% Mn, 1% C) | 1 to 2 |
| Miscellaneous | up to 6 |
| | 100 |

33. An apparatus for electric welding comprising a tubular metallic electrode having a core, said core containing oxidizing ingredients, means for passing an electric current between said electrode and the work and thereby creating a molten weld pool, and means for supplying deoxidizing flux to the weld pool and thereby creating a molten slag pool on the molten weld pool, said oxidizing core in the electrode decarburizing the weld pool and said deoxidizing flux deoxidizing the weld pool.

34. In mechanism for electric welding of a weld seam in steel work, at least two electrodes spaced apart in a direction longitudinally of the weld seam which forms a direction of weld travel, means for passing electric current between the electrodes and the work to form a weld pool, means for supplying slag ingredients to form a molten slag pool on the weld pool, the one of said electrodes which is forward in the direction of weld travel bringing into the weld pool oxidizing ingredients which decarburize the weld pool, and the one of said electrodes which is rearward in the direction of travel bringing into said weld pool deoxidizing ingredients which deoxidize the weld pool.

35. A welding apparatus of claim 34, in which the rearward electrode also contains alloying ingredients.

36. In apparatus for electric welding of work forming a weld seam, at least one electrode having a flux core, means for passing electric current between said electrode and the work and thereby forming a molten weld pool, means for supplying a non-basic granular flux to the weld pool and thereby forming a molten slag on the weld pool, said flux core of the electrode being of basic character, and said means for supplying said granular flux supplying the same at a rate which exceeds the addition of basic flux from the flux core and maintains the slag always non-basic.

37. A welding apparatus of claim 36, in which there are at least two electrodes spaced along the weld seam in a direction which corresponds to a direction of progression of the weld, the forwardmost electrode being a tubular electrode having an oxidizing core and the rearwardmost electrode bringing deoxidizers into the weld.

38. A welding apparatus of claim 37, in which the rearwardmost electrode is a solid electrode and contains between 0.3% and 2% of manganese and between 0.05 and 2% of silicon in a steel sheath.

39. A welding apparatus of claim 37, in which there are two rearward electrodes both of tubular character, having steel sheaths and each containing a basic slag and deoxidizers.

40. In a welding apparatus, means for supplying to a weld seam at a weld site granular flux, an electrode located adjacent to the weld site, means for passing an electric current between the electrode and the work and creating a molten weld pool and a molten flux pool on the weld pool, said granular flux resting on the flux pool, and means for blowing a gas on the granular flux to exclude air filling the voids of the granules of flux covering at the weld site.

41. A welding apparatus of claim 40, in which the means for blowing the gas comprises means for blowing an oxidizing gas into the layer of granules.

42. A welding apparatus of claim 41, in which the means for blowing the gas comprises a nozzle penetrating beneath the layer of granules of flux.

43. A welding apparatus of claim 41, in which the means for blowing the gas comprises means for blowing carbon dioxide.

44. In apparatus for electroslag welding of low carbon and low alloy steel, at least one tubular electrode positioned adjacent the work, means for supplying an oxidizing granular acid flux to the weld site, and means for passing an electric current from the electrode to the work and thereby melting the flux and producing a molten slag pool and thereby melting the metal and producing a molten weld pool, the slag decarburizing the metal, the electrode having a basic flux core which contains a deoxidizing ingredient which deoxidizes the molten weld pool, the quantity of the granular flux being in excess of the quantity of the flux core so as to maintain the slag non-basic.

45. In apparatus for electroslag welding of low carbon and low alloy steel work at a weld seam, a plurality of electrodes located adjacent the weld seam, said electrodes being tubular electrodes having flux cores, means for passing an electric current between said electrodes and the work and thereby producing a molten slag pool and by the molten slag pool melting the work and producing a molten weld pool, one of said tubular electrodes containing an oxidizing flux and having a relatively thin wall and a voluminous core, and another of said tubular electrodes containing deoxidizer and having a relatively thick sheath and a relatively smaller core.

46. A welding apparatus of claim 45, in which the ratio of the cross section of the conductive sheath of the electrode having an oxidizing core with respect to the cross section of the conductive sheath of the electrode having a deoxidizing core is less than 0.7.

47. A welding apparatus of claim 45, in which the tubular electrode which contains a deoxidizer also contains alloying elements in the core.

48. A welding apparatus of claim 45, in which the core of the electrode which is oxidizing is also non-basic and the core of the electrode which is deoxidizing is basic.

49. In apparatus for electroslag welding of low carbon or low alloy steel at a weld seam, means for supplying a granular flux to the weld site, an electrode having a flux core containing deoxidizers, means for passing an electric current from the electrode to the work and thereby melting flux to produce a slag pool, and said flux pool melting the work to form a weld pool, and means for blowing an oxidizing gas on the flux pool.

50. A welding apparatus of claim 49, in which the granular flux is supplied at a rate which maintains the metallic pool weakly acid.

51. A welding apparatus of claim 49, in which the granular flux is supplied at a rate which maintains the welding pool semi-basic.

52. A welding apparatus of claim 51, in which the tubular electrode bringing in the deoxidizer has a basic core.

53. A welding apparatus according to claim 51, in which the electrode which brings in the deoxidizer also contains alloying elements.

54. An apparatus for electroslag welding of low carbon and low alloy steel work at a weld seam, comprising means for supplying flux to the weld site, an electrode of alloyed steel containing at least 2% of deoxidizer in the metal located adjacent the weld site, means for passing an electric current between the electrode and the work and thereby melting flux to obtain a molten slag pool and by the heat from the slag pool melting metal from the work to form a molten weld pool, and means for blowing an oxidizing gas on the surface of the molten slag pool.

55. An apparatus for electroslag welding of carbon steel and low allow steel work at a weld seam, which comprises means for supplying non-basic granular flux to the weld site, said flux being capable of producing a slag having a basicity index lower than 1.2, an electrode located adjacent the weld site and composed of steel having at least 1.2% by weight of deoxidizer of the class consisting of silicon, titanium, aluminum and magnesium in metallic form and at least 0.8% by weight of manganese, means for passing electric current from the electrode to the work and thereby melting flux to form a molten slag pool and by the heat from the slag pool melting metal of the work to form a weld pool, and means for blowing an oxidizing gas on the surface of the slag pool to oxidize the slag pool and decarburize the weld pool.

References Cited by the Examiner

UNITED STATES PATENTS

| | | | |
|---|---|---|---|
| 2,511,976 | 6/50 | Frost | 219—73 |
| 2,620,423 | 12/52 | Komers et al. | 219—73 |
| 2,909,642 | 10/59 | Landis | 219—73 |
| 3,024,352 | 3/62 | Dankier | 219—126 |
| 3,051,822 | 8/62 | Bernard et al. | 219—74 |
| 3,153,719 | 10/64 | Arikawa et al. | 219—73 |

RICHARD M. WOOD, *Primary Examiner.*